United States Patent [19]
Bachman

[11] 3,863,869
[45] Feb. 4, 1975

[54] VTOL CAPSULE AIRCRAFT

[75] Inventor: Gerhart Herman Bachman, Toronto, Ontario, Canada

[73] Assignee: Flight Capsule, Inc., Toronto, Canada

[22] Filed: Apr. 10, 1972

[21] Appl. No.: 242,451

[52] U.S. Cl............. 244/23 D, 244/23 C, 244/139
[51] Int. Cl............................................. B64c 29/04
[58] Field of Search .... 244/23 R, 23 A, 23 B, 23 C, 244/23 D, 12 R, 12 B, 12 C, 13, 15, 17.11, 17.15, 34 A, 53 R, 54, 55, 139, 17.19; 180/7 R, 7 P, 115, 116, 117; 239/265.17

[56] References Cited
UNITED STATES PATENTS

| | | | |
|---|---|---|---|
| 2,369,652 | 2/1945 | Avery | 244/17.19 |
| 2,923,495 | 2/1960 | Von Zborowski | 244/34 A X |
| 3,045,951 | 7/1962 | Freeland | 244/23 C |
| 3,107,071 | 10/1963 | Wessels | 244/23 C |
| 3,124,323 | 3/1964 | Frost | 244/12 C |
| 3,135,481 | 6/1964 | Sudrow | 244/23 C |
| 3,335,960 | 8/1967 | Alderson | 244/12 R X |
| 3,387,801 | 6/1968 | Kelsey | 244/23 C |
| 3,647,141 | 3/1972 | Murday | 239/265.17 X |
| 3,697,020 | 10/1972 | Thompson | 244/23 C X |

FOREIGN PATENTS OR APPLICATIONS

| | | | |
|---|---|---|---|
| 932,948 | 7/1963 | Great Britain | 244/23 C |
| 932,948 | 7/1963 | Great Britain | 244/23 |

*Primary Examiner*—Trygve M. Blix
*Assistant Examiner*—Barry L. Kelmachter

[57] ABSTRACT

The following disclosure concerns a flight capsule in the form of a hollow capsule body or enclosure for a pilot having a central axis adapted to be disposed vertically when the capsule is at rest with a jet engine at the upper end of the capsule embodying thrust nozzles directing thrust gases in the direction of the capsule adjustably between an included angle of 180 degrees at right angles to said axis and an included angle of about 60 degrees in such manner that the capsule body is located entirely within the thrust streams from said nozzles.

3 Claims, 10 Drawing Figures

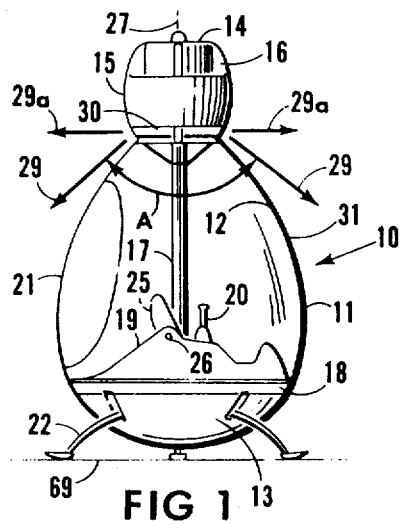
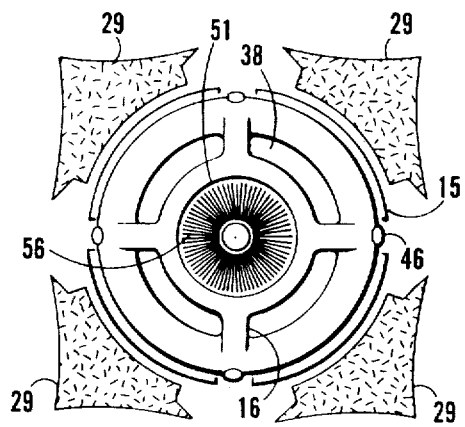
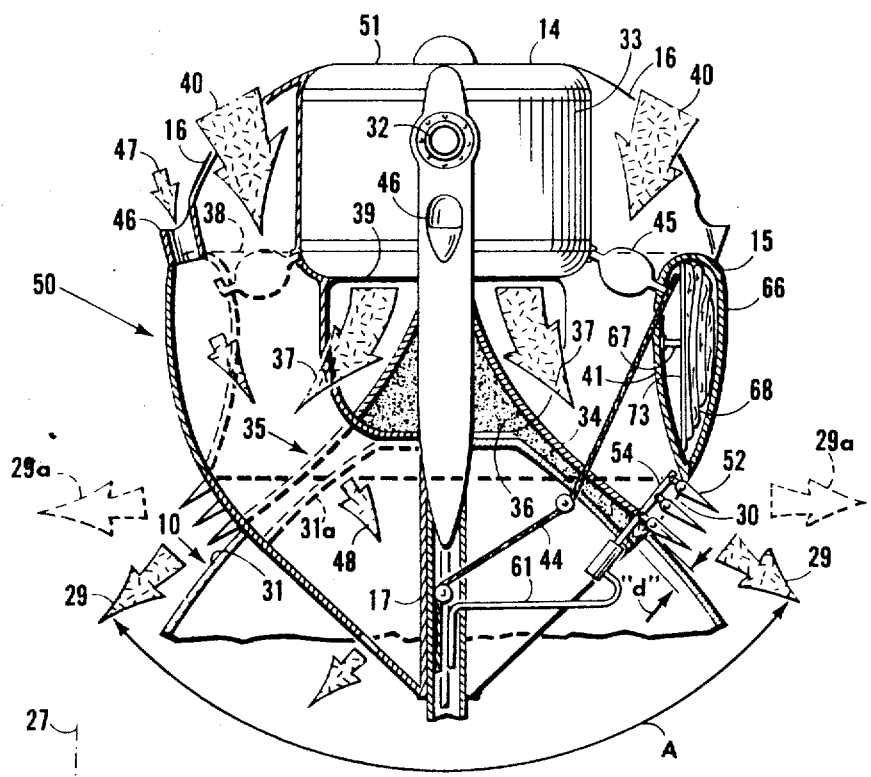
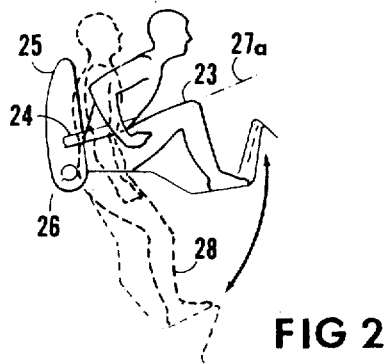

3,863,869

VTOL CAPSULE AIRCRAFT

This invention relates to a flight capsule.

Wingless VTOL (vertical take-off and landing) aircraft have been suggested heretofore and have comprised a so-called flying bedstead or hover-craft configuration embodying a platform having a plurality of fan engines therein. Such prior devices are characterized by a criticality of control to achieve and maintain smooth and stable performance. Such prior devices are impressive in their ability to rise from the ground surface vertically or to descend to the ground surface, but are limited in practical terms to low altitude low-speed service. Prior wingless aircraft are not suitable for prolonged flight at high speeds.

It is a main object of the invention to provide a flight capsule adapted for smooth flight control and stable handling at all stages of flight performance and capable of flight at high speeds in any direction.

It is another object of the invention to provide a flight capsule as herein set forth characterised by simple flight controls embodying a throttle, a lift control and a direction-determining joystick or equivalent and having simple control abilities as compared with those of prior winged and wingless aircraft.

It is a further object of the invention to provide a flight capsule as herein set forth embodying a single engine and a passenger enclosure located on the axis of jet thrust of the engine and wholly within the jet stream of said engine.

Other objects of the invention will be appreciated by a study of the following specification taken in conjunction with the accompanying drawings.

IN THE DRAWINGS

FIG. 1 is a perspective elevation of the flight capsule of the invention.

FIG. 2 is a diagram of pilot attitude in the capsule of the invention, the vertical attitude of the craft being illustrated in bold lines.

FIG. 3 is a plan view of the upper engine portion of FIG. 1 illustrating segment thrust streams emitted by said engine.

FIG. 4 is a sectional view of the upper jet engine portion of the flight capsule of the invention.

Figure 7:
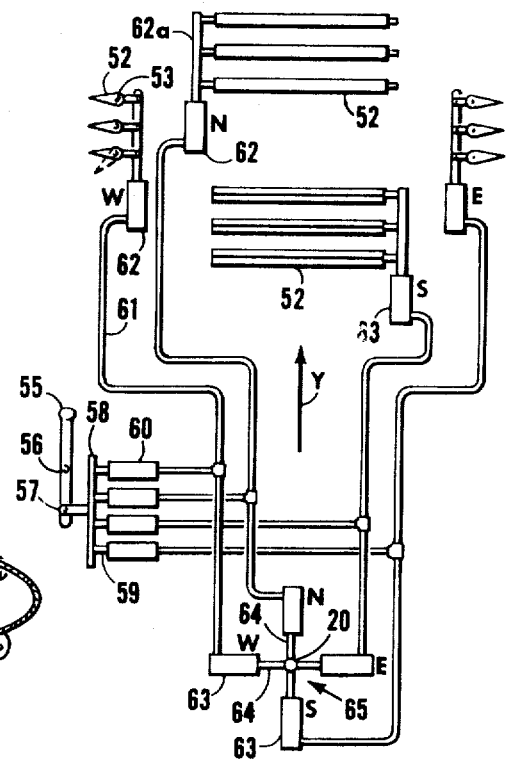

FIG. 7 diagramatically illustrates a closed circuit hydraulic arrangement and system for changing the angle of thrust of thrust gases in each quadrant of the engine in FIG. 3 by virtue of a joystick control.

Figure 8:
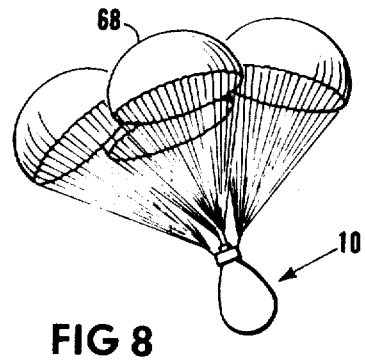

FIG. 8 is a perspective view of an emergency parachute ability of the flight capsule of the invention.

Figure 9:
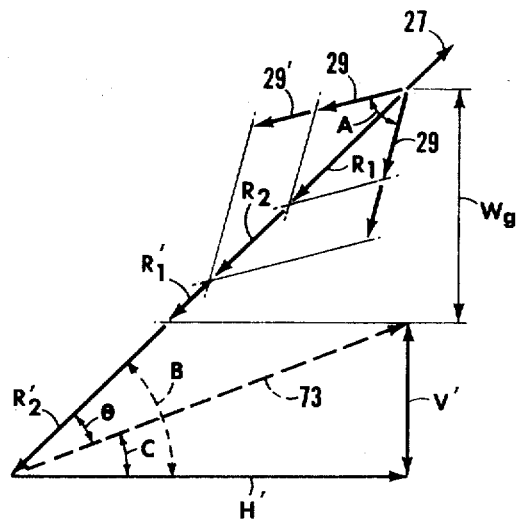

FIG. 9 is a vector diagram of thrust and gravity forces acting on the flight capsule during flight in inclined attitude.

Figure 6:
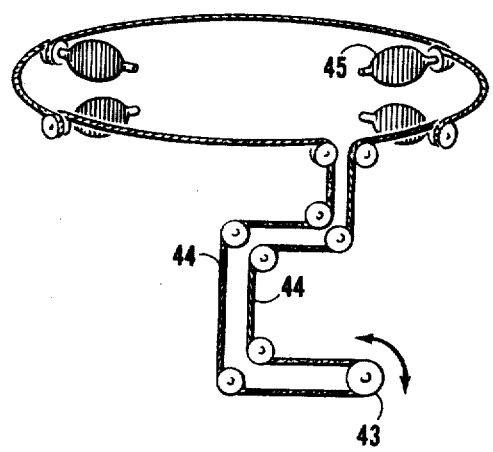
FIG. 6 illustrates joystick twist for controlling the angle of secondary air induction to the engine to manipulate deflectors by twisting the joystick to effect controllable twist on the capsule of the invention during flight.
Figure 10:
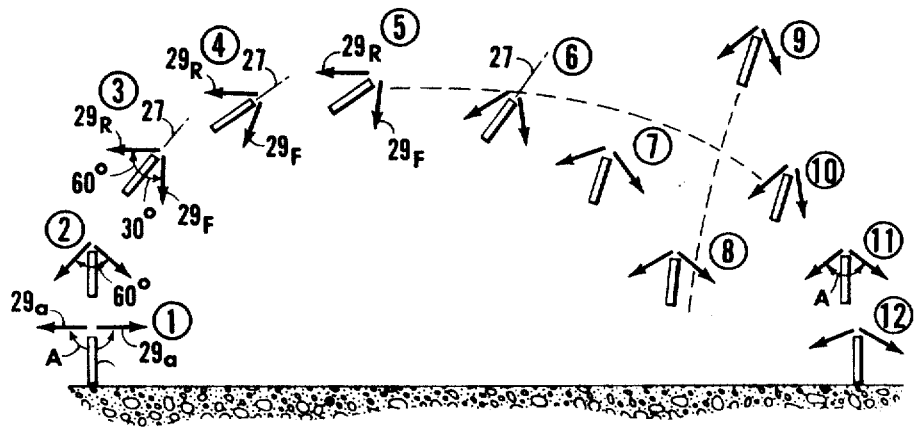

FIG. 10 is a diagram illustrating take-off and landing and inflight characteristics accomplished by the controls of FIGS. 6 and 7 in association with thrust control.

In the drawings, the flight capsule 10 as indicated in FIG. 1 comprises a somewhat egg-shaped capsular cabin structure 11 characterized by an upper curved smooth end or apex 12 as opposed to a base large end 13, the upper end 12 having superimposed thereon a jet engine 14 associated with a secondary air inductor ring 15 and connected by quadrant fin mounting structure comprising hollow structural vanes 16 to a central hollow structural column 17 connecting to a lower inner frame 18 carrying a seating structure 19 and a joystick control 20. A rear access door 21 permits entrance to and exit from the capsule cabin 11. Landing gear may be provided in the form of three spring-like legs 22.

As indicated in FIG. 2, the operator, shown in bold lines 23 at the "at rest" vertical position of the capsule 10, may be fastened by seat belt 24 to the pivoted seatback 25 pivoted as at 26 so that when the capsule axis 27 moves to the inclined direction 27a the operator may move to a standing position indicated by chain lines 28.

Referring again to FIG. 1 the flight capsule 10 of the invention is adapted to eject thrust gases in four thrust streams 29 from quadrant segment engine openings 30 over the outer surfaces 31 of the capsule 11 to define a cone-like curtain of thrust gases of an included cone angle A, as shown in FIGS. 3 and 4.

The jet engine 14 is preferably of that class recognized as a light weight lift augmentor jet engine used as a thrust booster, such as a Rolls Royce RB 162 or equivalent, having of the order of up to 6,000 pounds thrust maximum but operable continuously at thrust values of the order of one-half such maximum. Such light-weight lift augmentor jet engines ordinarily of the order of less than 500 pounds in weight are small and have a short service life at maximum thrust. However, while such class and type of engine in the state of the art is utilized at maximum thrust in service, the use of such class of engine at substantially one-half or less of maximum thrust as contemplated herein renders such an engine type useful for long and dependable service with a momentary ability of extremely high thrust power.

The engine 14 as indicated in FIG. 4 will ordinarily be characterized by an electric starter motor 32 and is adapted in the concept of flight capsule disclosed herein to be supported by the four rigid hollow structural vanes 16 serving as segment structural members extending from rigid connection with the outer case or frame 33 of engine 14 toward the capsule 10 through the cabin enclosure 11 thereof for rigid connection to the central hollow or tubular column 17. Between said supporting structural vanes 16 and the enclosure 11 are provided the conical deflector plates 34 formed of a high thermal resistance material and defining a diverging conical head or deflector 35 insulated such as by rigid insulation 36 from the enclosure 11 and adapted to direct thrust gases 37 outwardly to each of the quadrant segment openings 30 defined by outer secondary air induction annulus or ring 15 spaced from the engine 14 by a suitable gap 38 defining a secondary air intake opening positioned in relation to the exit opening 39 of the engine to provide a pumping effect or general induction of secondary air 40 to mix with and to cool the thrust gases 37 and to cause said mixed gases to be converged by the inner annulus surfaces 41 of the ring 15 outwardly toward the thrust orifice 30 beyond each pair of segment structural members 16. Observe that the thrust orifice or opening 30 in each segment is spaced by a step distance $d$ from the upper surface 31a in the cabin structure or enclosure 11 to allow for insulation 36. The central column 17 provides a structural connection beyond the engine 14 through quadrant structures 16 with the base frame 18 (FIG. 5) of substantially hemispherical configuration formed of rigid apertured aluminum framing of the aircraft type, the latter carrying the outer cabin enclosure 11 and the floor seating structure 19 having swivel seat backs 25 pivotal on pivots 26.

The joystick control 20 embodies a hand twistable turning rod 42 adapted by a pulley 43 located at its universal mounting axis at said pulley (not shown for purpose of clarity but of conventional and well-known design) to move the control lines 44 up through column 17 as shown in FIG. 6 to change the angle of directional damper vanes or members 45 mounted in the intake openings 38 of FIG. 4. Such directional damper vanes when deflected one way or the other will interfere with the induction of secondary air and in so doing will develop a resulting torque on the capsule 10 about its axis 27. Thus the pilot may cause the capsule to migrate rotationally about its axis in the direction of twist applied by the pilot's hand to the joystick control 20. The net torque of the engine on its mountings may thus be compensated for. This will be different for different engine types and the directional damper members may be initially trimmed for the inherent torque effect of the specific engine, the pilot thus being permitted control beyond such torque effect by turning the capsule on its axis during flight so that the pilot and capsule may face in the direction desired.

The segment structural vanes 16 each embody air scoop tubes 46 adapted to scoop exterior air and to conduct same to the interior of the capsule cabin or enclosure 11 for ventilation, as indicated by arrows 47, 48, it being understood that the discharge of exterior clean air into the cabin may be controlled by suitable valving or electric pumps or the like with provision for heaters therefore if desired, such details not being shown to avoid complexity of illustration and embodying conventional technology as to such detail.

Figure 5:
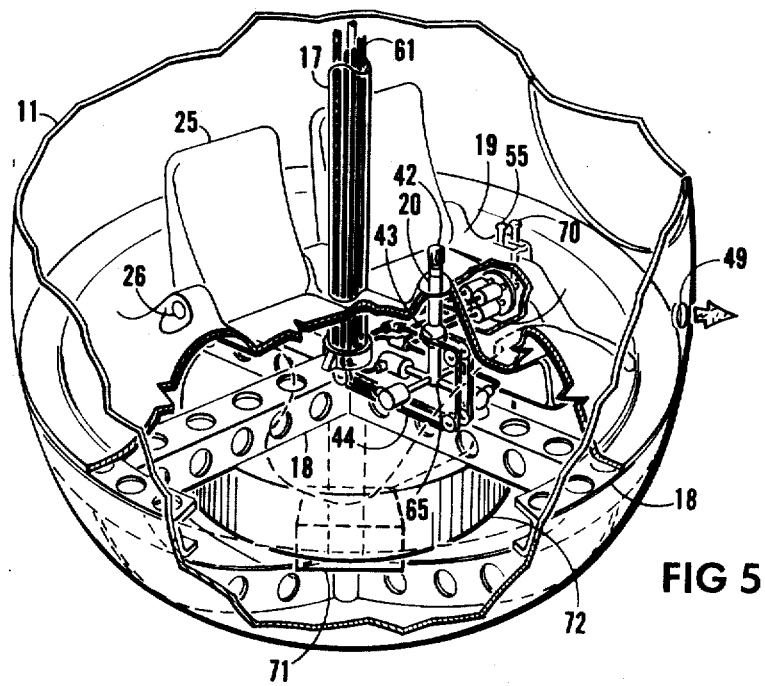
FIG. 5 is a perspective view partially cut away of detail of the control and personal cabin structure of the capsule of the invention.

As indicated in FIG. 5 a cabin exit or vent aperture 49 may be provided to permit the escape of interior air, it being understood that again this exit aperture may be controlled such as by valves, conventional regulators or the like. Accordingly, the interior of the capsule is intended to be pressurized if desired with fresh air at suitable temperature with a rate of air change necessary to the occupants of the capsule as well as to the maintenance of satisfactory temperature and pressure. The control of this function will more easily be accomplished in flight due to the action of the air scoop apertures 46 and their greater effectiveness with greater forward speed in the axial direction of flight.

The propulsion head 50, comprising the assembly of the rigid hollow segment vanes 16 rising outwardly and upwardly from rigid central column 17 to support the concave cone deflector head 35 and the engine 14 in inner spaced relationship to the outer annular air induction ring 15 and having an engine primary air intake opening 51 in said engine and four segment secondary air intake openings 38 is characterized by segment thrust gas exterior openings 30 having pivotable thrust-deflection vanes 52 pivoted on shafts 53 between each pair of structural vanes 16 in such manner that the vanes 52 within each such thrust opening 30 may be rotated together by common link mechanism 54 in each segment to direct jet thrust gases radially outwardly over the outer surfaces 31 of capsule 10 at an included angle A between about 60° and 180°, the latter being included between chain line arrows 29a.

The segment thrust nozzle structures defined by the engine openings 30 and the thrust deflection vanes 52 are controllable to adjust the angle A to a maximum corresponding to zero vertical thrust or lift by the lift control lever 55 of FIGS. 5 and 7. The said lever 55 is pivoted as at 56 and connects by link pin 57 to an actuator bar 58 adapted simultaneously to move pistons 59 in hydraulic cylinders 60 each connecting with an individual hydraulic line 61 connecting to a hydraulic cylinder 62 in each set of deflecting vanes 52 for each segment nozzle structure. Also, each of the hydraulic lines 61 connects to a respective individual hydraulic cylinder 63 associated in quadrant relationship by its piston rod 64 with the lower end 65 of joystick 20. Each of the hydraulic lines 61 represents a closed circuit with its corresponding hydraulic cylinders 60, 62, 63. In assembly, excess hydraulic fluid is introduced into each of the hydraulic lines 61 for each quadrant nozzle with the joystick 20 in the neutral or central position and the thrust deflection vanes 52 at a full radial outward position of an included angle A of 180° and the lift control lever 55 in full clockwise or forward position corresponding to zero lift. Under these circumstances cylinders 60 and 62 will be in full retracted position, and each cylinder 63 will be in an intermediate position between the fully extended and fully retracted.

From this point on, the lift control lever 55 when moved counter-clockwise on the pin 56 of FIG. 7, i.e., rearwardly relative to the pilot, will cause pistons 59 of cylinders 60 to actuate the corresponding cylinders 62 to adjust the deflection vanes 52 of the quadrant nozzle structures simultaneously in all quadrants to define a smaller included angle A. At an intermediate position of the lift control lever 55 between maximum lift and zero lift the angle A will be of the order of 120°. Considering now the neutral position of the joystick 20 under the latter condition and considering the flight direction represented by arrow Y and referring to the four cylinders 63 respectively as N, E, S, W, it will be evident that motion of the upper end of the joystick in the direction of the arrow Y will cause the bottom end 65 thereof to withdraw piston 64 of cylinder N drawing piston 62a into cylinder 62N to reduce lift of the quadrant thrust nozzle of the capsule facing in the direction of the arrow Y. There will be a corresponding increase in the lift angle of the nozzle vanes 52S accomplished by actuating cylinder 63S. The E and W thrust nozzle structures will not be affected.

Under these circumstances the pilot would be drawing the joystick back toward him and the forwardly facing thrust nozzle structure will change its angle in a direction towards zero lift and thus will have a greater radial component of thrust than the rearward directed thrust nozzle in which the angle of thrust has been increased to provide a greater lift component. The capsule will tip backwardly in so far as the pilot is concerned, whereas if the joystick is pushed forwardly the capsule will tip forwardly. In other words, the capsule will tip in the direction in which the joystick is moved. Furthermore a twisting of the joystick will simultaneously rotate the capsule on its axis to the position desired by the pilot, through adjustment of the directional damper vanes 45. Thus a turn to the left may be executed by motion of the joystick to the left accompanied by a slight counter-clockwise turning of the joystick to maintain the orientation of the capsule on its axis relative to the direction of flight.

It is preferred that the lift control lever 55 be arranged with its most rearward position in FIG. 5 representing maximum lift and a minimum value of the angle A. Under conditions prior to takeoff the lift control lever should be in its forwardmost position corresponding to zero lift. If, however, it is permitted to move to its most rearward position such would render the joystick control inoperative by confining it to the neutral position. Thus at the two end positions of the lift control lever 55 the joystick control becomes restricted to define a straight axial course. Lever 55 in flight will normally be positioned at about 80 per cent of maximum thus allowing fully effective joystick control.

The outer annular induction ring 15 is hollow and includes outer quadrant shells 66 which are adapted to be blown off or ejected by a conventional explosive release cartridge device 67 adapted to be electrically fired, in the event of failure of engine 14, to eject a parachute 68 radially outwardly from each quadrant of the propulsion head 50. Thus, as seen in FIG. 8, the capsule 10 is adapted to release emergency chutes 68 in a radial direction so that they will catch and break a fall of the capsule immediately upon loss of thrust power. Conventional flame-out detection devices (not shown) associated with jet engine 14, such as of the thermal type, in the path of the jet flame from the engine are arranged to fire such cartridge devices 67 to release the parachutes either after a predetermined temperature drop or below a predetermined temperature depending upon which conventional form of flame-responsive detector system is employed. Such firing system entails a normally closed firing switch held in the open circuit position by the detector sensing a temperature above such predetermined temperature, said normally closed switch being manually or otherwise controllably held open during engine starting procedure.

Referring again to FIG. 1 the capsule at rest on the ground surface 69 directs thrust gases horizontally in the direction 29a, i.e., directly radially outwardly relative to the capsule axis 27. The engine is then warmed up and the throttle 70 (FIG. 5) opened to a substantially full-thrust position whereupon lift control lever 55 is smoothly moved to the maximum lift position, i.e., forwardly, for a smooth and rapid takeoff in the vertical direction.

In this connection it is to be commented that for two persons the capsule structure itself including frame structure 18, a battery 71, a mechanical gear and the like weighs of the order of 200 pounds and that the engine 14 and associated propulsion head structure 50 weighs on the order of 500 pounds. Thus allowing for passenger weight of 400 pounds total and baggage weight of 100 pounds the dead weight without fuel is of the order of 1,200 pounds and not greater than 1,500 pounds for a practical flight capsule.

Engines of the type intially referred to have a fuel consumption on the average not greater than one pound of fuel per pound of thrust per hour; the engine type specifically referred to in this specification may develop at maximum upwards of 6,000 pounds of thrust. With a fuel weight equal to the dead weight, i.e., equal to 1,500 pounds of fuel, and thus a total weight of 3,000 pounds takeoff, the average thrust requirement is 2,250 pounds during a flight duration of 40 minutes at a thrust level necessary to overcome total weight. Thus fuel tank 72, mounted to the base frame 18 beneath the seating structure 19, may carry between 200 and 300 gallons of fuel for operating flight times up to one hour when operating at approximately one half of full engine thrust or less. Under such conditions the rate of fuel consumption per pound of thrust is more favorable.

Having regard to drag conditions minimized substantially by the arrangement of the capsule within the thrust curtain of gases provided by the jet engine, only a relatively small amount of thrust in excess of that required to overcome gravity is required to achieve substantial speeds.

In FIG. 9, assuming the capsule axis 27 is inclined at an angle B equal to 45° from the ground surface or horizontal, then the front and rear thrust vectors 29 will be represented by the first resultant $R_1$ to which must be added the resultant of two additional thrust vectors from the other two side quadrants to develop a total resultant $R_2$ having a vertical component equal to the weight due to gravity Wg. An increase in the thrust vectors 29 to a greater value 29' would then develop a first resultant $R_1'$ and a second resultant $R_2'$ giving a net vertical component of thrust equal to V' and a horizontal component of thrust H'. The direction of flight will then be at an angle C, from the horizontal defining a flight path 73, and the axis 27 of the capsule will thus be nose-up by an angle $\theta$ from this flight path. Thus the flight capsule has a positive angle of attack in its flight characteristics which becomes less as the speed becomes greater but never becomes negative.

Typical flight programs are illustrated in FIG. 10 in which the capsule and the thrust forces are indicated schematically. In the left hand portion of FIG. 10 capsule 10 is at rest on ground surface 69 with thrust gases 29a at an angle A of 180°. On takeoff as described, angle A is reduced to say 60° at relatively high engine thrust by moving lift control lever 55 rearwardly. Assuming that during such takeoff the pilot is facing in a direction to the right in FIG. 10, the joystick 20 may then be pressed forward in the direction he wishes to move while lift control lever 55 is moved from maximum lift position to an intermediate position thus to cause the rear jet 29r to be raised to an angle of say 60° from axis 27 while maintaining the forward jet 29f at an angle of 30° to the axis 27. This causes the capsule to tip forwardly to trace a curved trajectory arriving at capsule position 4 at which the joystick 20 may be brought to the neutral position to make the forward and rear jets 29f, 29r equi-angular with respect to the axis 27. The diagram illustrates in position 5 a drop in trajectory as a result of a reduction in throttle or lessening of thrust accomplished by a pulling back on the joystick to adjust the forward thrust 29f to greater angle with respect to the axis and the rear thrust 29r to a lesser angle. This causes the capsule to swing its base slightly forwardly or to move the axis 27 of the capsule to a more vertical attitude as indicated at position 6 whereupon lift control lever 55 may be moved to reduce lift while throttle lever 70 is further reduced to permit the capsule to fall to successive positions 7 and 8. However, prior to reaching the ground surface 69 the operator may shift the lift control lever to maximum and increase the throttle to cause the capsule rapidly to achieve a new ascending flight path such as to position 9. Accordingly the pilot has a readily available technique for recovering from an unsuitable landing position and at high velocity if desired. Otherwise the capsule proceeds from position 6 to position 10 whereupon throttle is reduced and lever 55 is moved to increase the angle A to the degree necessary at positions 11 and 12, accomplishing hovering and a soft landing at position 12.

It will be evident from the foregoing that the invention relates to a flight capsule in which a central rigid control column defines longitudinal axis of the capsule, a jet engine is mounted on one end of the column and has thrust outlet openings or nozzles defining a thrust stream diverting outwardly toward the other end of the column. A hollow capsule body adapted to contain a pilot is fixed to the column in such manner as to be located entirely within the thrust stream from the thrust nozzles. The jet engine is adapted to induct large quantities of secondary air to control the temperature of thrust gases passing exteriorly over surfaces of the capsule which latter is preferably of egg-like shape, the larger end defining the base of the capsule and the smaller or apex end being adjacent and within the path of thrust gases of the engine. Deflector devices controllable by the pilot or operator are adapted to be adjusted to control the rotational position of the capsule to orientate it in the desired direction of flight.

While a variety of flight characteristics have been discussed herein it will be evident that no comment has been made on those conditions which give rise to aerodynamic lift for the reason that same are readily recognisable by skilled persons. The capsule being entirely within the jet stream of the engine offers no exterior protuberance to exterior air giving rise to resistance or drag excepting the engine and inductor ring including the torsional damping vanes. High speed capability is thus evident. Visability of the pilot through the capsule and exterior thrust streams at and near maximum thrust can be distorted by turbulent variation of the index of refraction of hot gases. Under conditions of extreme difficulty exterior vision may be provided by conventional periscope structure (not shown) extending from the pilot position through one or more segment structural vanes to the vane exterior.

I claim as my invention:

1. A flight capsule comprising: a hollow rigid axial control column defining a central axis; a hollow substantially egg-shaped envelope co-axially about said column, said envelope having an apex end and a base end; a pilot floor structure within said envelope and extending substantially transversely of said axis; a jet engine located axially beyond said apex end of said envelope and having a forward intake opening and a rearward thrust outlet opening and a thrust axis coincident with said central axis; radial structural vanes extending from said column through said envelope to mount said engine and having an equi-angular separation therebetween to define thrust nozzle structure segments for said jet engine; an inductor ring of annular form supported by said structural vanes and extending in outer spaced relation to said engine relative to the outlet opening of the latter to define a secondary intake opening for the induction of secondary air; movable vane structures between said inductor ring and said engine movable to deflect intake secondary air to generate torque about said axis thereby influencing the rotational position of said envelope and said capsule; deflector devices supported in each of said jet nozzle structures adapted independently to direct jet thrust from each said thrust segment controllably in a continuously adjustable range between a first direction at right angles to said central axis and a second direction over said envelope at substantially 60° from said first direction towards said base end; a manually movable control within said envelope and active through said control column to control said deflection devices to control the thrust angle in each of said thrust segments; a fuel reservoir including a throttle connecting said reservoir to said engine, and means available to an operator for controlling said movable vane structures, said envelope being located entirely within the jet thrust from said jet nozzle structures.

2. A flight capsule comprising, in combination; a central rigid control column defining a longitudinal axis; a jet engine mounted on one end of said column and having a thrust outlet opening defining a thrust axis extending towards the other end of said column and coincident with said longitudinal axis; structure mounted on said column adjacent said one end thereof and deflecting exhaust gases from said engine to define a plurality of thrust streams diverging outwardly towards said other end of said column; a hollow capsule body mounted upon and surrounding said column and disposed entirely within said thrust streams; and nozzle structures for each of said thrust streams including control means associated therewith and available to an operator for moving each of said thrust streams between an angle of substantially 90° to said axis through a control angle of substantially 60 degrees, said control means being in the form of a pilot operable joystick and independent hydraulic acutators extending from said joystick to said nozzle structures; and a lift control lever for adjusting the angles of all said thrust nozzle structures simultaneously.

3. A flight capsule comprising, in combination; a central rigid control column defining a longitudinal axis; a jet engine mounted on one end of said column and having a thrust outlet opening defining a thrust axis extending towards the other end of said column and coincident with said longitudinal axis; structure mounted on said column adjacent one end thereof and deflecting exhaust gases from said engine to define a plurality of thrust streams diverging outwardly towards said other end of said column; a hollow capsule body mounted upon and surrounding said column and disposed entirely within said thrust streams; and air induction structure in the form of an annular air induction ring surrounding and annularly spaced outwardly from said engine adjacent said thrust outlet opening, said engine and said induction ring defining therebetween an annular air induction secondary air intake opening; radial structural vanes extending from said column through said capsule body to mount said engine and said air induction ring to said column, said vanes being equiangularly spaced about said longitudinal axis to define therebetween a plurality of thrust nozzle structures for said thrust stream; said air induction ring being hollow and having releasable outer casing portion; at least one parachute within said induction ring; and engine responsive projecting means for relasing said casing and said parachute responsive to engine failure in flight.

* * * * *